(12) United States Patent
Paratore et al.

(10) Patent No.: US 8,662,894 B2
(45) Date of Patent: Mar. 4, 2014

(54) METHOD AND APPARATUS FOR TEACHING MUSIC CONCEPTS

(76) Inventors: Bernardo Paratore, Doylestown, PA (US); Richard M. Brewer, Ijamsville, MD (US)

( * ) Notice: Subject to any disclaimer, the term of this patent is extended or adjusted under 35 U.S.C. 154(b) by 2034 days.

(21) Appl. No.: 11/512,992

(22) Filed: Aug. 30, 2006

(65) Prior Publication Data

US 2007/0060351 A1    Mar. 15, 2007

Related U.S. Application Data

(60) Provisional application No. 60/712,557, filed on Aug. 30, 2005.

(51) Int. Cl.
*G09B 19/22*    (2006.01)

(52) U.S. Cl.
USPC .......................................................... 434/128

(58) Field of Classification Search
USPC ............ 434/251, 430, 128; 273/43, 134, 135, 273/242, 243, 244, 247, 259, 273, 277, 296
See application file for complete search history.

(56) References Cited

U.S. PATENT DOCUMENTS

| | | | | |
|---|---|---|---|---|
| 176,471 A * | 4/1876 | Juch | ................................. | 84/476 |
| 181,827 A * | 9/1876 | Eckhardt | ........................ | 84/476 |
| 702,298 A * | 6/1902 | Frederickson | ................ | 273/301 |
| 1,139,098 A | 5/1915 | Bostwick | | |
| 1,189,450 A | 7/1916 | Hofer | | |
| 1,217,810 A | 2/1917 | Noel | | |
| 1,338,475 A | 4/1920 | Za Haris | | |
| 1,392,977 A | 10/1921 | Swan | | |
| 1,599,568 A | 6/1924 | Koehler | | |
| 1,589,878 A | 8/1924 | Gilbert | | |
| 1,675,528 A | 1/1927 | Bishop | | |
| 1,619,683 A * | 3/1927 | Stinson | ........................... | 84/472 |
| 1,796,845 A * | 3/1931 | Jolls | ................................ | 84/472 |
| 2,231,020 A * | 2/1941 | McCaulley | ................... | 273/301 |
| 2,582,544 A * | 1/1952 | Johnson | ........................ | 273/301 |
| 2,619,867 A * | 12/1952 | Frisch | ............................. | 84/475 |
| 2,864,275 A * | 12/1958 | Fraleigh | ...................... | 84/471 R |
| 3,375,748 A * | 4/1968 | Aaron | ............................ | 84/471 R |
| 3,667,759 A * | 6/1972 | Barr | .............................. | 273/295 |
| 3,727,511 A * | 4/1973 | Piper | ........................... | 84/471 R |
| 3,994,500 A | 11/1976 | Schow | | |
| 4,061,337 A * | 12/1977 | Callender | ..................... | 273/243 |
| 4,069,735 A * | 1/1978 | Bertram | ......................... | 84/474 |
| 4,464,971 A * | 8/1984 | Dean | ............................ | 84/471 R |
| 4,465,282 A * | 8/1984 | Dillon | .......................... | 273/247 |
| 4,736,665 A * | 4/1988 | Sorribes | ....................... | 84/471 R |
| 4,819,539 A * | 4/1989 | Searing | ........................... | 84/476 |
| 4,895,374 A | 1/1990 | Bowles | | |
| 5,009,430 A * | 4/1991 | Yuhasz | ......................... | 273/255 |
| 5,441,277 A * | 8/1995 | Lenhart et al. | ................ | 273/249 |
| 5,540,132 A * | 7/1996 | Hale | ............................ | 84/470 R |
| 5,599,022 A | 2/1997 | Ben-Horin | | |
| 5,665,927 A * | 9/1997 | Taki et al. | ....................... | 84/609 |

(Continued)

*Primary Examiner* — Nikolai A Gishnock

(57) ABSTRACT

A method for playing a music game. The game is played by having each player move along a game path that includes a plurality of spaces, each of which is associated with a key signature. Each player advances along the path when he or she correctly identifies the elements of music structures. A random or pseudorandom event generator may be used to select the music structure elements and an event verifier may be used to correct the construction of the music structures. Each player may earn royalties play money in the course of a game.

18 Claims, 18 Drawing Sheets

(56) References Cited

U.S. PATENT DOCUMENTS

| | | | |
|---|---|---|---|
| 6,015,947 A * | 1/2000 | Moberg | 84/471 R |
| 6,057,501 A * | 5/2000 | Hale | 84/470 R |
| 6,124,540 A | 9/2000 | Lotito | |
| 6,169,239 B1 | 1/2001 | Aiardo | |
| 6,259,013 B1 | 7/2001 | Walsh | |
| 6,288,316 B1 | 9/2001 | Fajardo | |
| 6,431,873 B1 * | 8/2002 | Flagg | 434/127 |
| 6,464,508 B1 | 10/2002 | Ryan | |
| 6,588,756 B1 | 7/2003 | Hughes | |
| 6,831,220 B2 | 12/2004 | Varme | |
| 6,841,724 B2 | 1/2005 | George | |
| 6,870,085 B2 | 3/2005 | MacCutcheon | |
| 6,967,274 B2 * | 11/2005 | Hanington | 84/476 |
| 7,041,891 B2 | 5/2006 | Smith Carter | |
| 7,306,226 B2 * | 12/2007 | Gagnon | 273/242 |
| 7,325,805 B2 * | 2/2008 | Ritchie et al. | 273/259 |
| 7,435,886 B2 * | 10/2008 | Shifrin | 84/313 |
| 2005/0082750 A1 * | 4/2005 | Grauzer et al. | 273/149 R |
| 2006/0076733 A1 | 4/2006 | Ritchie | |

* cited by examiner

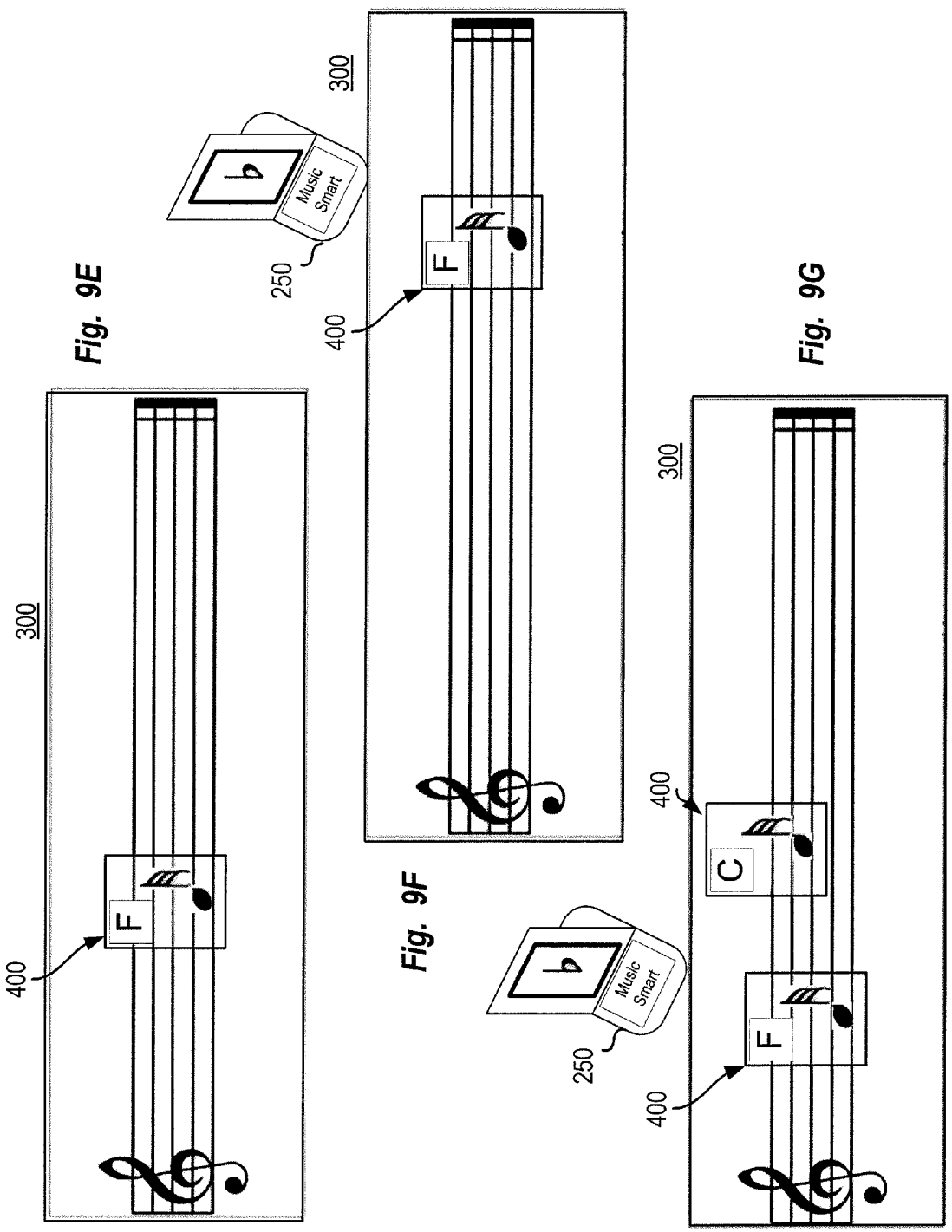

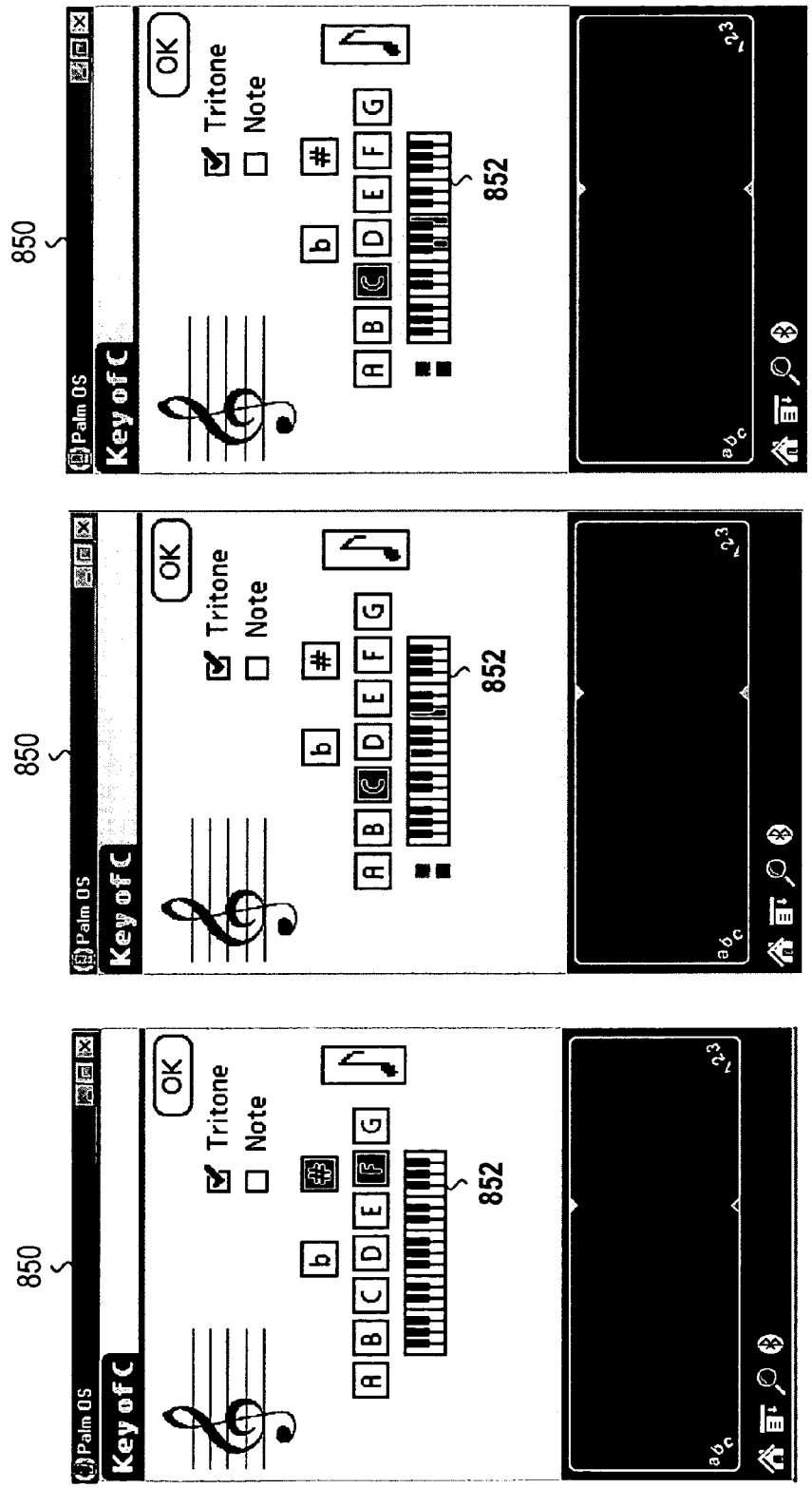

METHOD AND APPARATUS FOR TEACHING MUSIC CONCEPTS

CROSS REFERENCE TO RELATED APPLICATION

This application claims the benefit of U.S. Provisional Patent Application No. 60/712,557, filed on Aug. 30, 2005, and entitled "Music Smart Board Game", the entire disclosure of which is incorporated herein by reference.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings:

FIGS. 9E-9G show steps required to complete a tritone play structure in a game in accordance with one embodiment of the present invention; and FIGS. 9H-9J show steps to verify a tritone play structure in a game in accordance with one embodiment of the present invention.

DETAILED DESCRIPTION

Figure 1A:
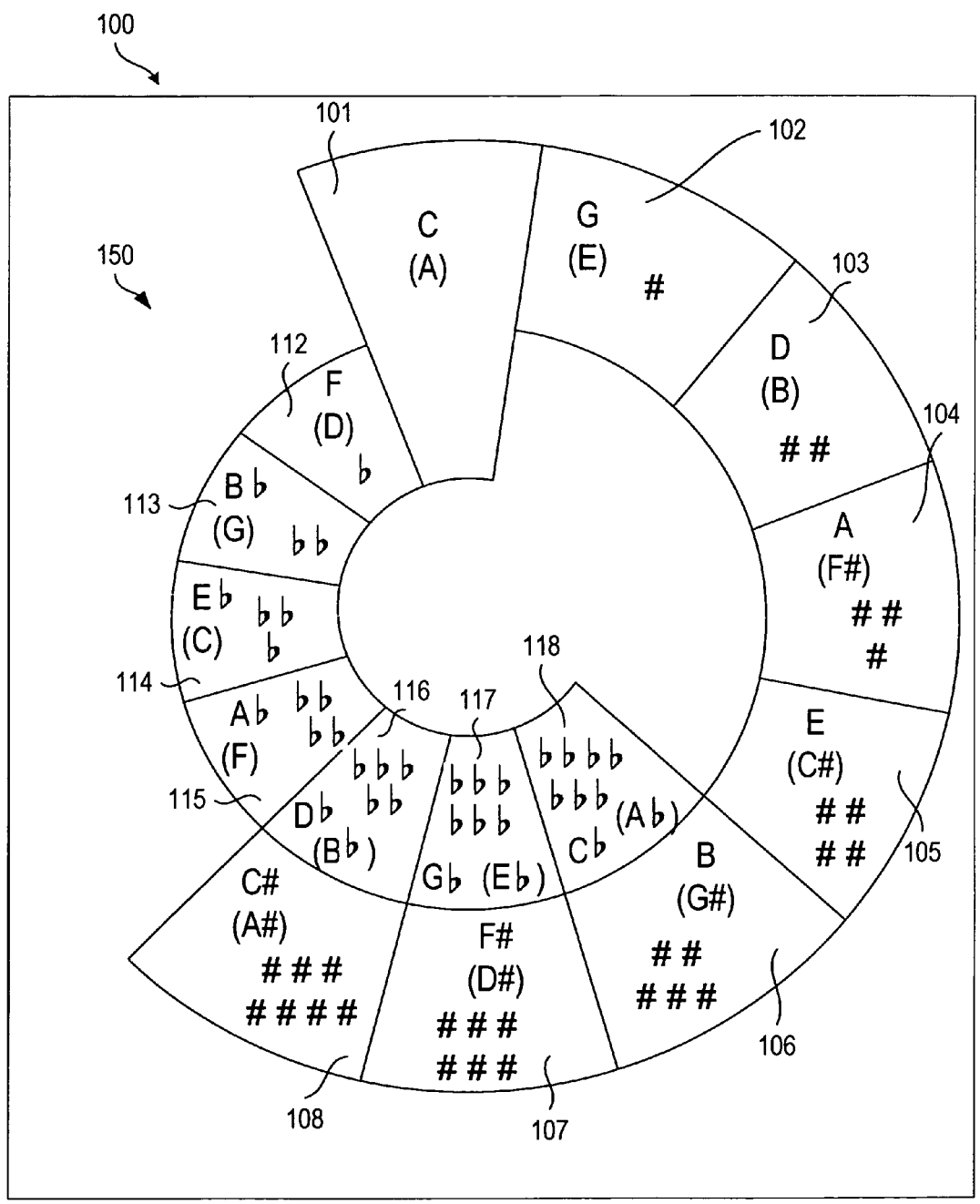
FIGS. 1A-1C show exemplary game boards depicting at least one path suitable for use in a game in accordance with one embodiment of the present invention.

Certain terminology is used herein for convenience only and is not to be taken as a limitation on the embodiments of the present invention. In the drawings, the same reference letters are employed for designating the same elements throughout the several figures.

The words "inside tritone", refer to a note pair (interval) separated by a distance of three tones (six semitones) where both notes in the pair belong to the home scale. The words "outside tritone", refer to a note pair (interval) separated by a distance of three tones (six semitones) where one notes in the pair belongs to the home scale and the other note does not.

The terminology includes the words above specifically mentioned, derivatives thereof and words of similar import.

Game Overview

A game in accordance with one embodiment of the present invention teaches fundamental elements of music structures and concepts using a natural and comfortable approach. In this context, the game offers children and adults alike, the opportunity to gradually gain familiarity and internalize fundamental music skills as to become instinctual thus providing great opportunity to pursue music education in classical, popular and jazz styles with ease. Starting from the most basic, fundamental music skills comprise reading (note names and position on a music staff); understanding and feeling rhythm (note duration and time signatures); recognize tonalities and their relationships (key signatures); recognize and build scales (sequence of notes separated according to specific patterns); recognize and build intervals (two notes separated by specific distances); recognize and build triads and chords (three or more stacked notes separated by specific distances) and recognize and build progressions (sequence of chords). In addition, a game in accordance with one embodiment of the present invention also teaches basic concepts of music form comprising bars (group of notes that fit in one meter unit), phrases (group of bars constituting a melodic idea) and counterpoint (two or more phrases offset in time).

Traditional teaching methods rely on memorization, mnemonics and other mental gymnastics to help a student internalize these fundamental notions and concepts. Unfortunately more often than not, these devices result in more frustration and anguish for the student. A game according to this invention teaches fundamental music skills by drilling the players on seemingly unrelated music structures without requiring extensive instructions and explanations (and is thus suitable for relatively young children and adults alike) and through manipulation of visual representations of music entities (e.g., notes, time signatures, key signatures, etc.) by visually coordinated (e.g., color/shaped coded) event designators to facilitate association between the music entities and the game events. The drills embodied in the rules of the game gradually increase in complexity and build on each other. In fact, the minimum requirements to start playing the game are the abilities to count and knowledge of the first seven letters of the alphabet.

Figure 9A:
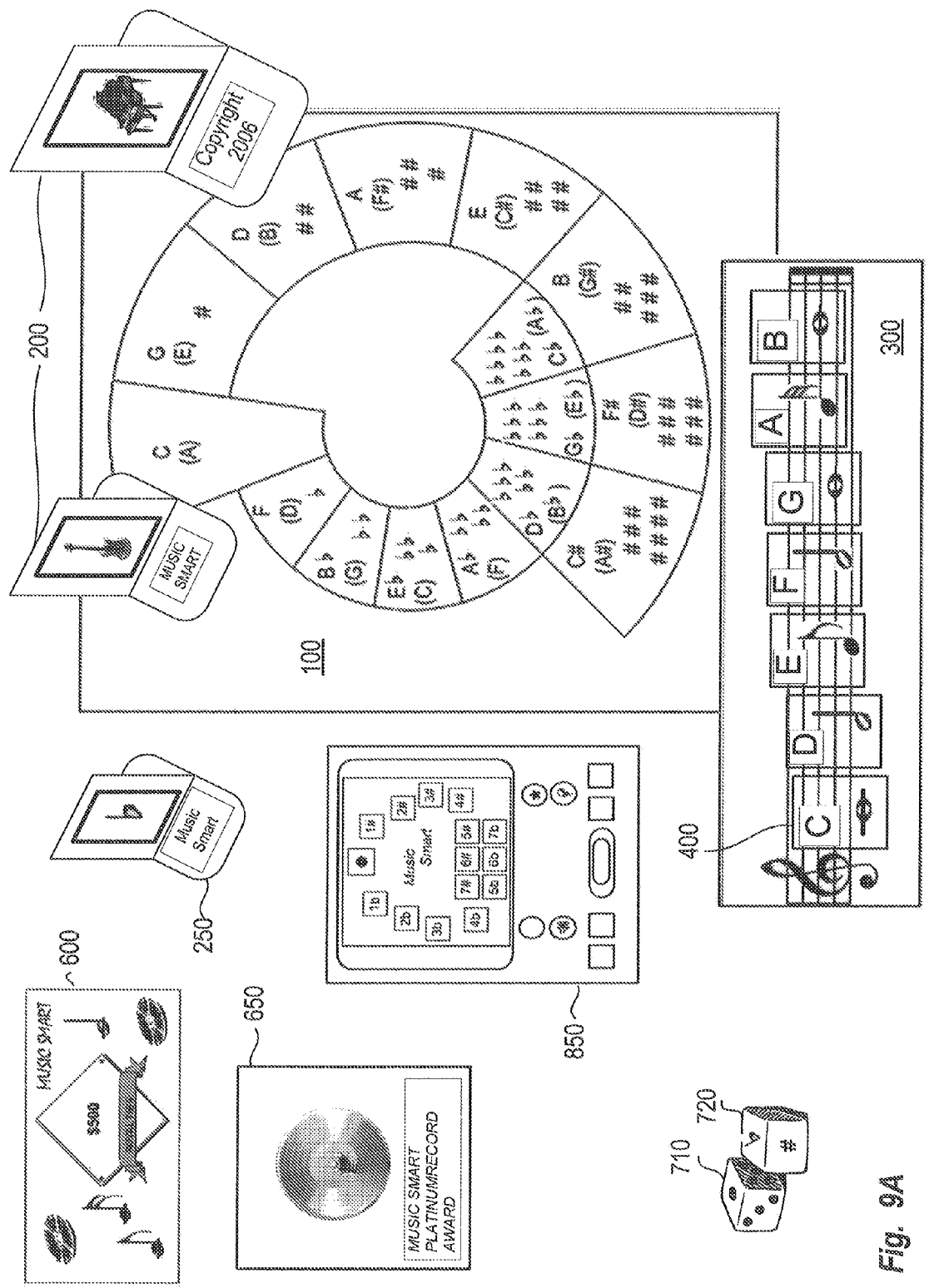
FIG. 9A is a schematic pictorial of an exemplary game in accordance with one embodiment of the present invention.

Referring to FIG. 9A, an exemplary game 900, in accordance with one embodiment of the present invention suitably comprises: a game board 100 depicting at least one path that each player is required to follow; a respective indicia of a player piece 200 for each player to mark the current position along at least one path; a respective indicia of a player card 300 for each player, depicting a music staff suitable for composing music structures as will be explained, e.g., scales, intervals, chords, progressions and so on; indicia of play piece 400 to construct music structures and indicia of accidental pieces 250 to keep track of certain events. The game 900 may also include an event generator 700 to challenge the players and an event verifier 850 to check the players' answers. The game 900 may also include indicia of royalties money 600 (e.g., play money in various denominations) to reward the players for successful completion of challenges along the path as well as for completion of a path; and indicia of platinum record award 650 awarded to a player for successful completion of a path on board 100.

In general, all players start at the same position on a board 100. At each position on the board, particular game events are handled by each player in turn where a player composes or adjusts at least one music structure on his or her player card 300 accordingly. Upon successful completion of a structure, a player may collect a certain amount of royalties money 600 according to a predetermined royalties schedule, and may either proceed to another position on the board, possibly after paying a fee, or play a more advanced structure in the current position to obtain a free pass to another position on the board and possibly receive additional royalties money 600 according to a predetermined schedule. The game may provide advanced challenges by allowing a player to simultaneously play two related positions on board 100, e.g., two enharmonic related key positions or two key positions that have a tritone relationship to name a few. As a general rule, the player with most assets in the form of royalty money 600 and platinum record awards wins a game.

The Game Board

Figure 1B:
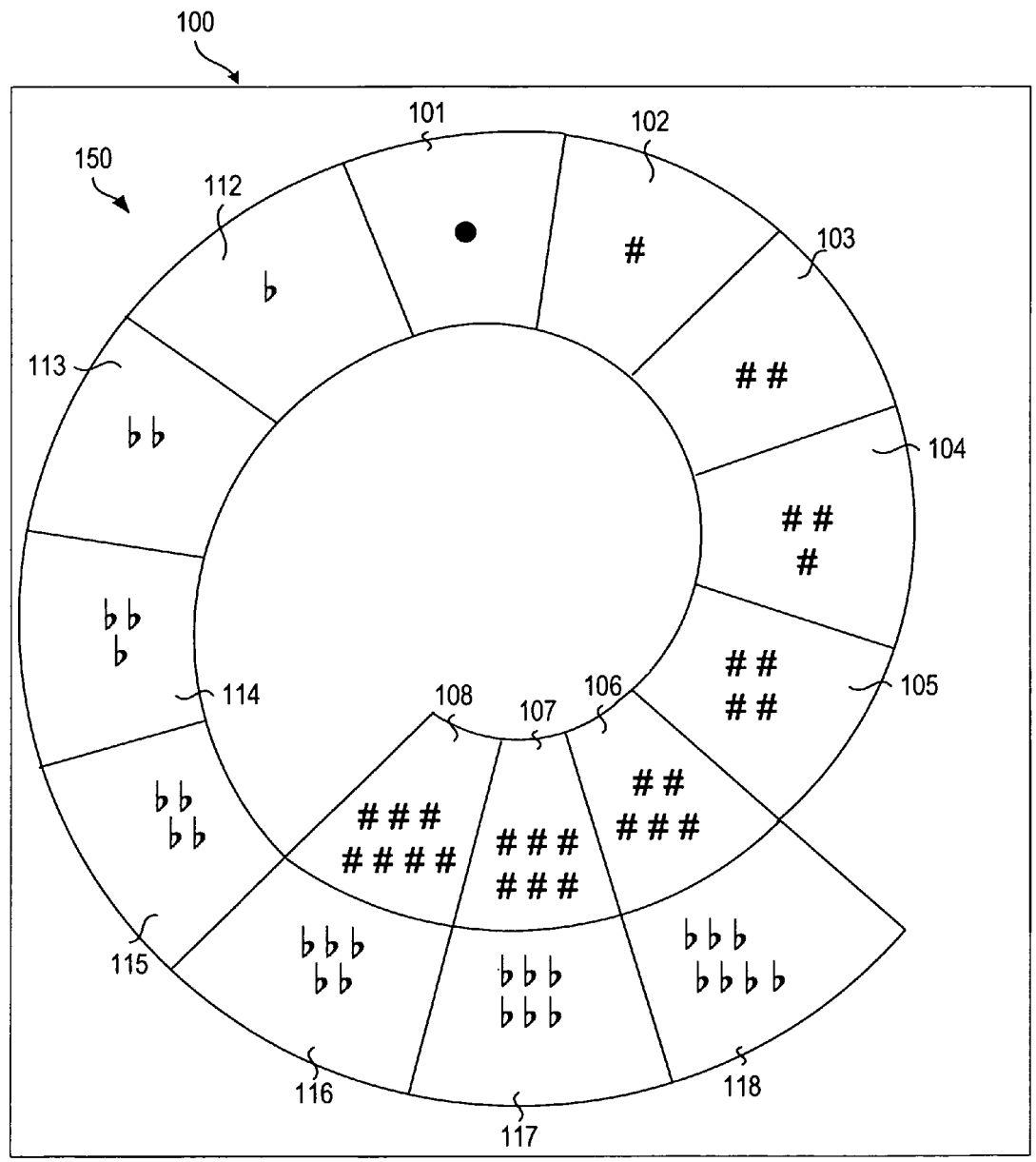
Figure 1C:
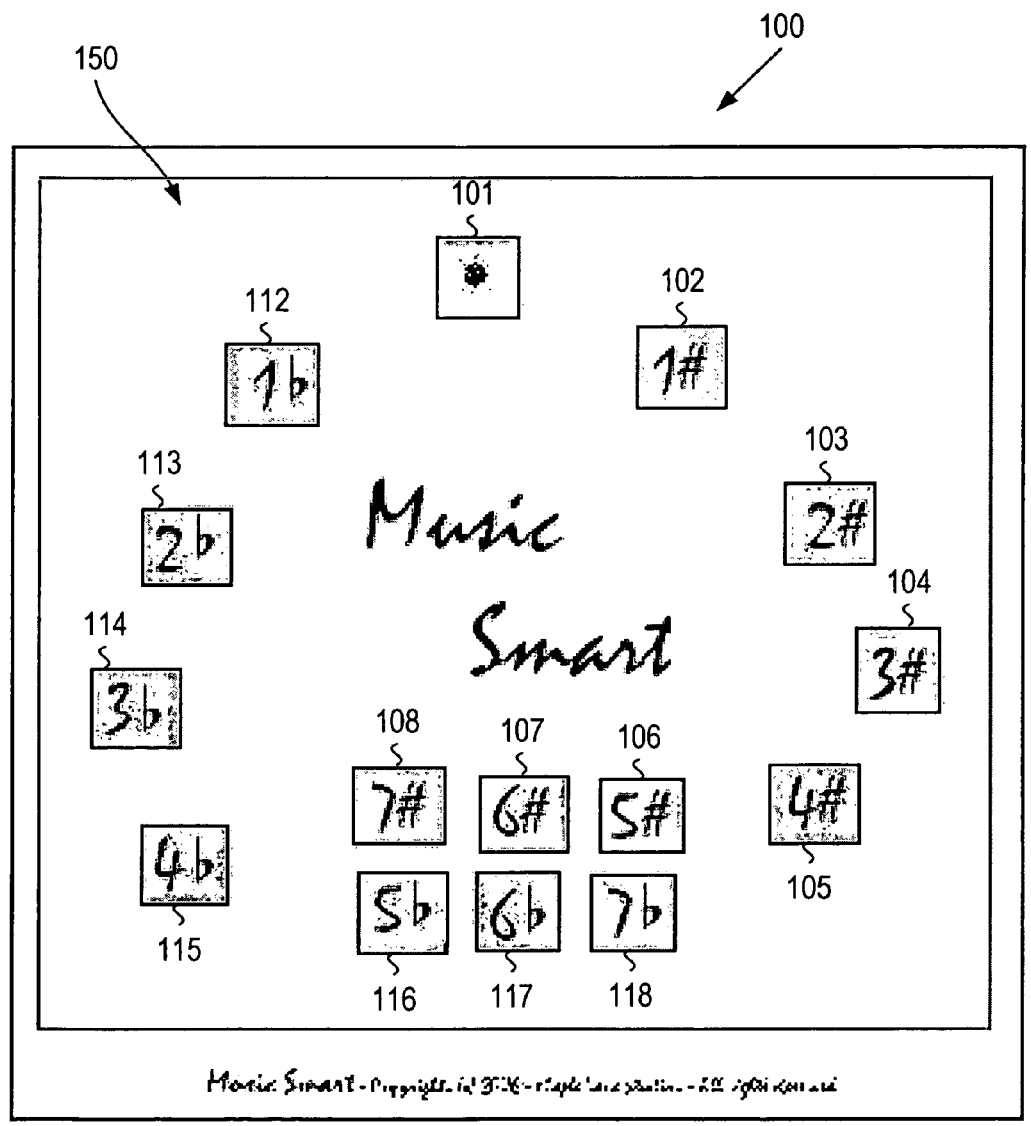

FIGS. 1A-1C illustrate various alternative embodiments of a game board. Board game 100 depicts circle of fifths 150, which is an arrangement of all 12 pitches in such a way that, when proceeding clockwise along the circle, any pair of adjacent pitch names represents the interval of a perfect fifth. There are 15 positions in circle of fifths 150 arranged in two circular paths. Start position 101 corresponds to key signatures where notes have no accidentals (sharps or flats). In the clockwise direction, positions 102, 103, 104, 105, 106, 107 and 108 each correspond to keys that have sharped notes. For example, key signatures corresponding to position 102 have one note sharped while keys corresponding to position 108 have seven sharped notes. Similarly, in the counterclockwise direction, positions 112, 113, 114, 115, 116, 117 and 118 each correspond to keys that have flatted notes. For example, key signatures corresponding to position 112 have one note flatted while keys corresponding to position 118 have seven flatted notes. Position pairs (108, 116), (107, 117) and (106, 118) represent different name spellings for the same pitch. That is to say, the sound or a scale corresponding to position 108 named C sharp are the same as the sound or a scale corresponding to position 116 named D flat. The overlap represents the fact that the same entity (pitch or key signature) has two different names or spellings. These pairs are said to be enharmonic equivalents.

The circle of fifths was described and illustrated by Johann David Heinichen in his Der General-Bass in der Composition (Dresden, 1728). It is a concise representation of the fundamental relationships characteristic of Western music and in fact, it has played a preponderant role in Jazz harmony. For example, when each pitch name is taken to represent the tonic of a major scale, the circle arranges keys in such a way that, beginning with C and proceeding clockwise, the number of sharps in each succeeding key increases by one; proceeding counterclockwise from C, the number of flats increases by one. The order in which the sharps and flats are added to a key signature when moving along the circle remains the same (i.e. which notes must be sharped or flatted when moving from one note to the next). The same relationships hold for the minor keys. Because of the way in which sharps or flats are added to key signatures along the circle, the number of pitches in common between the starting key and each successive key outward in either direction decreases by one. Thus, the circle of fifths also illustrates the degree of relatedness of key signatures—the further apart they are on the circle; the more distant in a musical sense are the two keys.

For these reasons, internalization of the relationships underlying the circle of fifth will provide the strong foundations necessary for mastering music skills. It is the object of the invention to introduce and develop intimate familiarity with the aforementioned foundation concepts in a fun, playful manner and without apprehension. It is upon these foundations that the development of music skills can precede with great ease.

To this end, circle of fifths 150 on board game 100 provides two paths on which multiple players can play games in accordance with this invention. Position 101 may be the start position for a game in accordance with one embodiment of the present invention. In the clockwise direction (sharps direction), the path ends on position 108, which overlaps with position 116 (enharmonic equivalence) and continues on to position 112 and back to position 101. In the counterclockwise direction (flats direction), the path ends on position 118, which overlaps with position 106 (enharmonic equivalence) and continues on to position 102 and back to position 101.

Figure 2A:
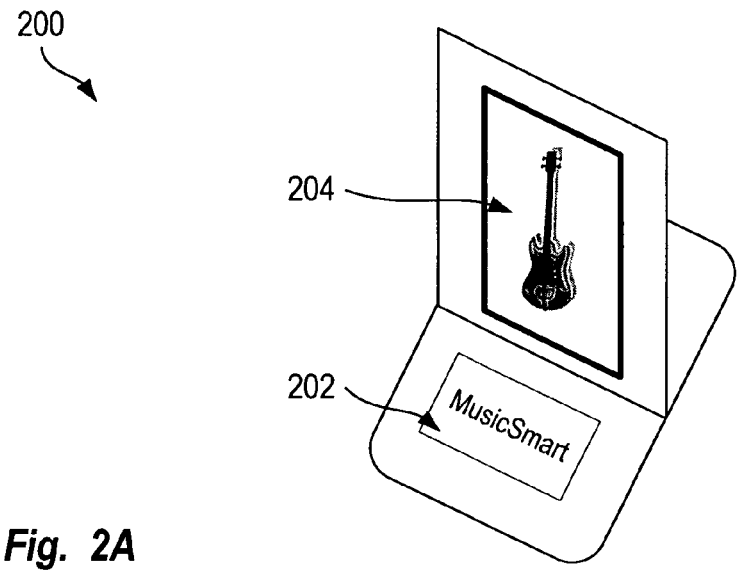
FIGS. 2A-2B show exemplary player pieces for use in a game in accordance with one embodiment of the present invention.
Figure 2B:
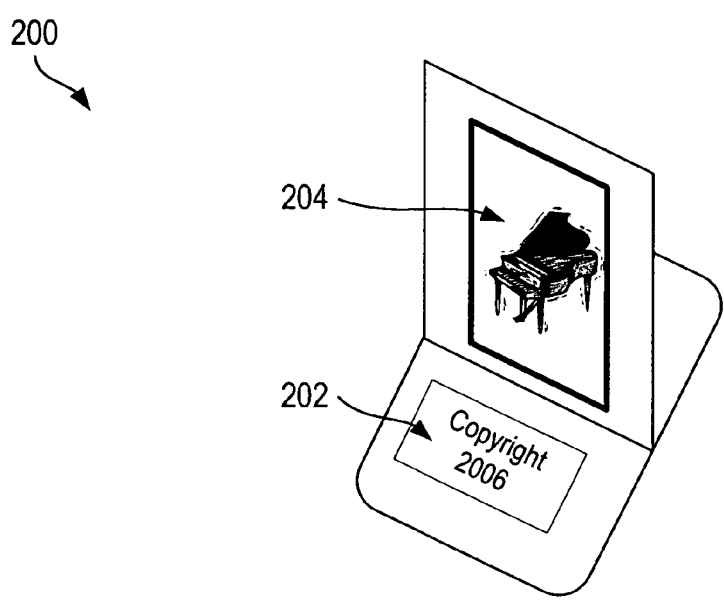
Figure 2C:
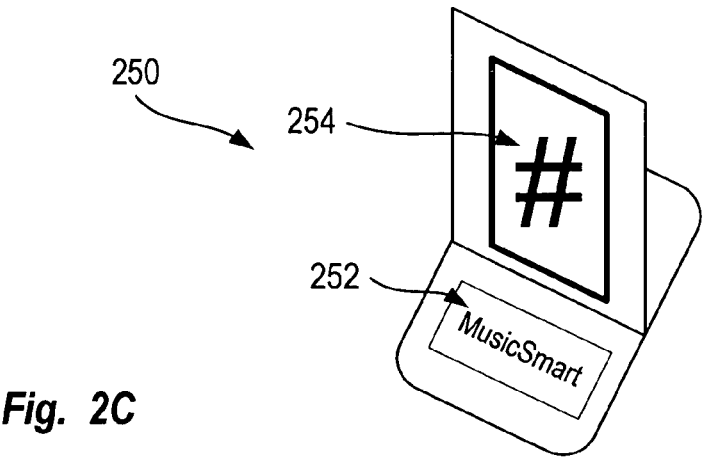
FIGS. 2C-2E show exemplary accidental pieces for use in a game in accordance with one embodiment of the present invention.
Figure 2D:
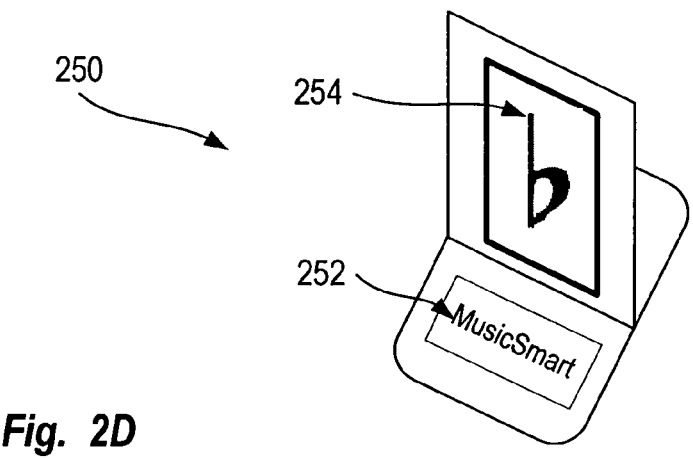
Figure 2E:
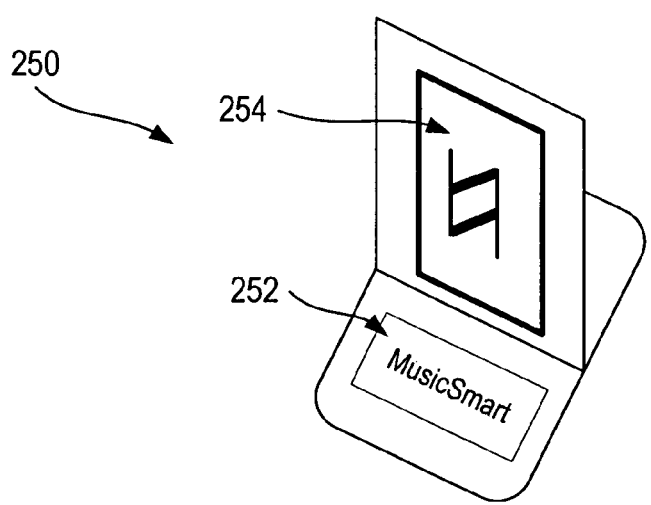

All players in a game start from position 101. They keep track of their respective progress along the paths using player pieces 200. FIGS. 2A-2B show exemplary player pieces 200 comprising base 202 and body 204 having distinctive indicia of music instruments, musicians faces or other subjects.

The Player Card

Referring to FIGS. 3A-3F, player card 300 is used by a player for construction of music structures in accordance with one embodiment of the present invention as he or she proceeds along the paths of circle of fifths 150. Player card 300 in its simplest embodiment comprises a body 301 with indicia of a blank music staff 302. A music staff is a collection of lines and spaces on which music is written in the form of notes and rests. Only 5 lines of the staff are shown while lines above and below the staff are implied.

Figure 3A:
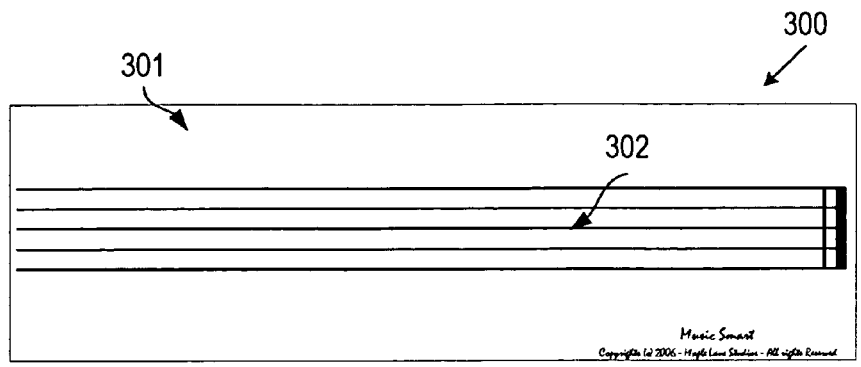
FIGS. 3A-3F show exemplary player cards for use in a game in accordance with one embodiment of the present invention.
Figure 3B:
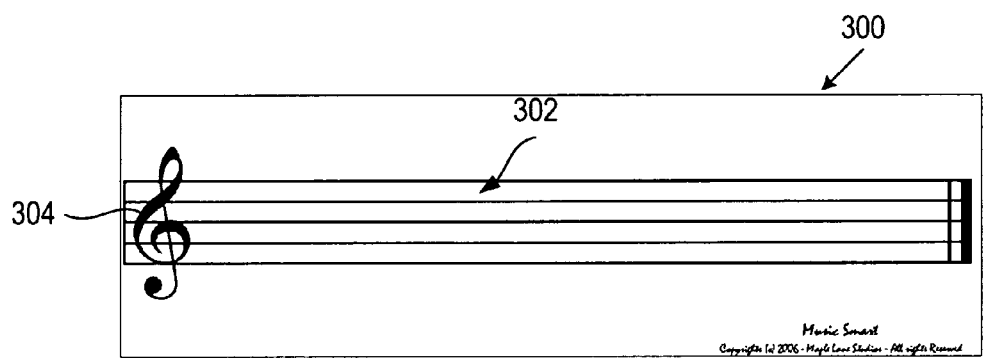
Figure 3C:
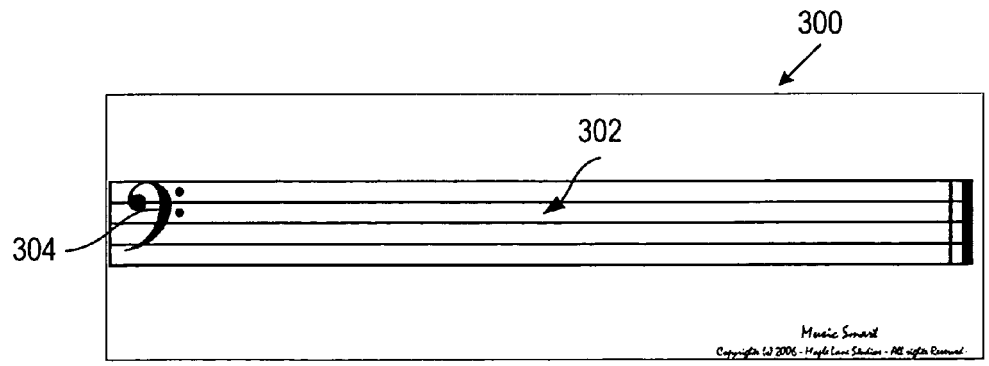

A player card 300 may have indicia of a clef 304 on staff 302. For example, FIG. 3B depicts G clef indicia 304 while FIG. 3C depicts a player card 300 with F clef indicia 304. A clef indicates the pitch represented by one line of a staff, in relation to which the other pitches of the staff can be determined. One or more player cards 300 can be used simultaneously in a game according to this invention. For example, a G clef player card and an F clef player card can be combined into set to form a grand staff that is typically used for piano music. Other combinations of multiple player cards with other clef indicia can also be used simultaneously as a set in a game according to this invention.

Figure 3D:
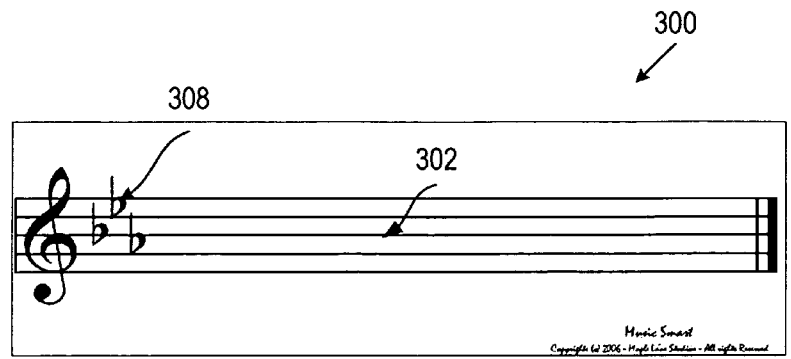

A player card 300 may have indicia of a key signature 308 on staff 302. For example, FIG. 3D depicts player card 300 with staff 302 setup for a key that has three flatted notes as indicated by indicia 308 depicting three flat symbols on the appropriate positions on the staff. Key signatures 308 associate player cards with corresponding positions on the paths of circle of fifths 150 on game board 100. That is to say, when a player starts on position 101 of game board 100, he or she will use one player card 300 or a set of player card 300 that has no key signature indicia 308. A player who has advanced to position 115 of game board 100 will use one player card 300 or a set of player card 300 that has key signature indicia 308 with 4 flat symbols. A player who has advanced to one of the locations in the enharmonic zone denoted by position pairs (108, 116), (107, 117) and (106, 118) may have the option to play with the corresponding pair of player cards 300 or corresponding pair of player card set.

Figure 3E:
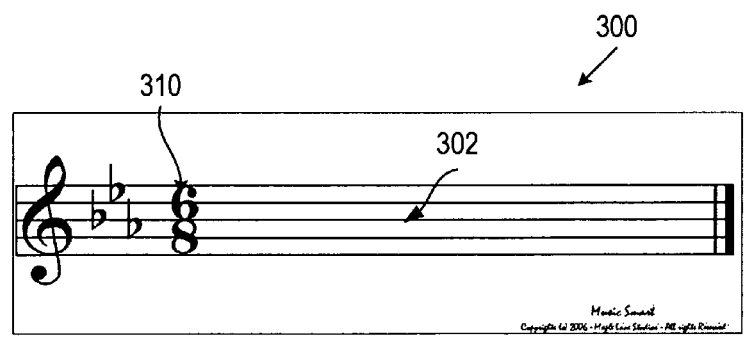

A player card 300 may have indicia of a time signature 310 on staff 302. For example, FIG. 3E depicts player card 300 setup for six eights time signature as indicated by indicia 310. Time signatures are used to guide construction of rhythmic structures in a game according to this invention.

Figure 3F:
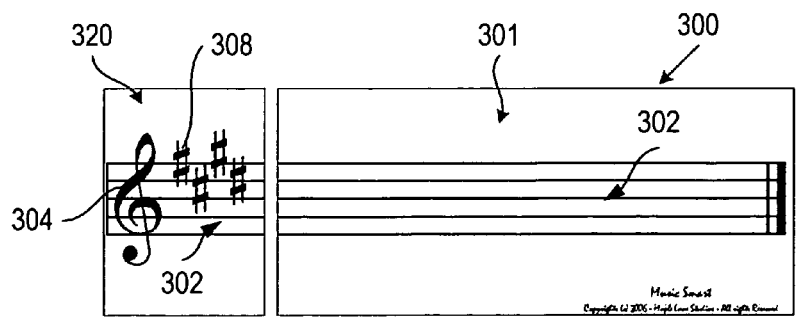

An alternate embodiment of player card 300 in two separate sections is depicted in FIG. 3F. One section of player card 300 comprises body 301 with indicia of staff 302 and the other section comprises body 320 having indicia of staff 302, indicia of clef 304 and indicia of key signature 308. When this embodiment of player card 300 is used in a game according to this invention, a player holds the section with body 301 for the duration of the game and replaces the section with body 320 corresponding to the location of his or her current position on the circle of fifths 150 on game board 100.

The Game Pieces

Figure 4A:
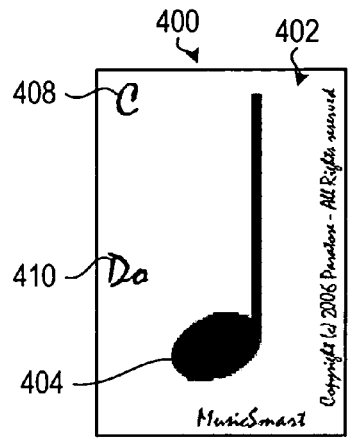
FIGS. 4A-4L show exemplary play pieces for use in a game in accordance with one embodiment of the present invention.
Figure 4B:
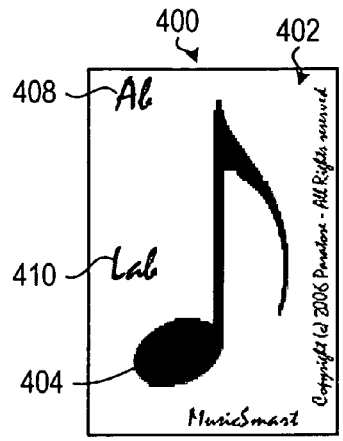
Figure 4C:
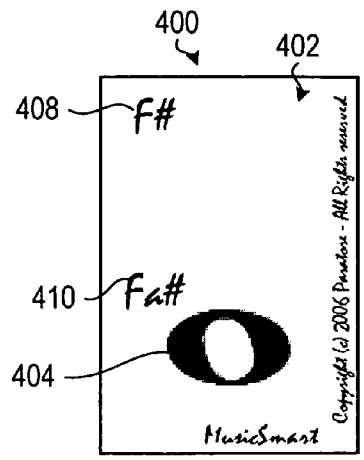
Figure 4D:
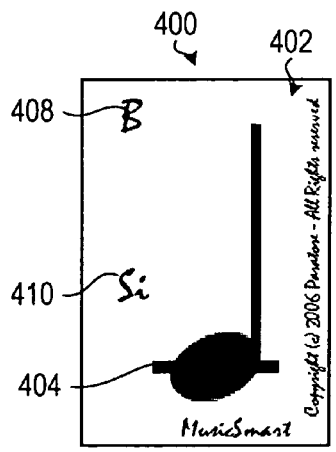
Figure 4E:
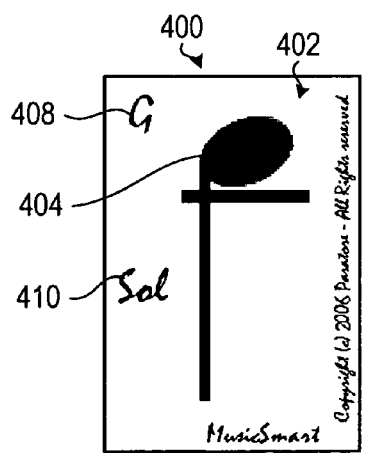
Figure 4F:
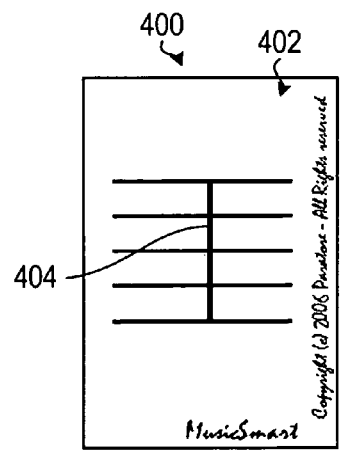
Figure 4G:
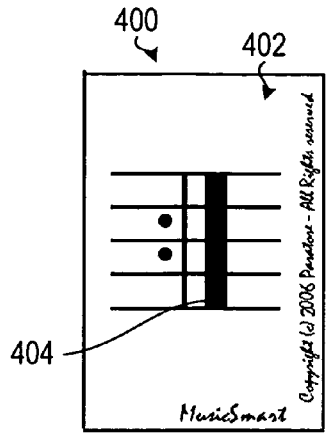
Figure 4H:
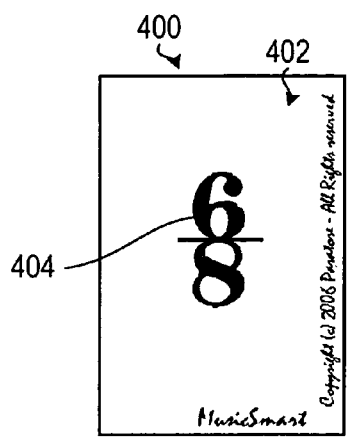
Figure 4I:
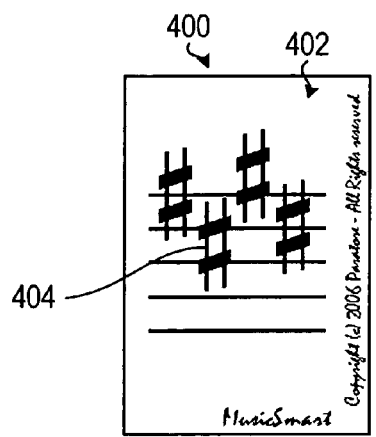
Figure 4J:
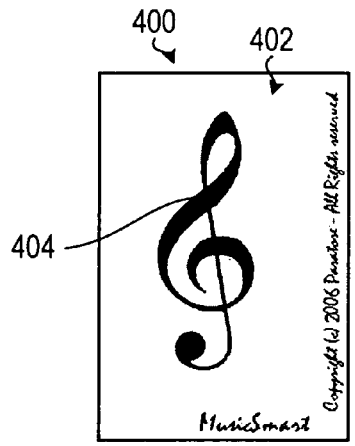
Figure 4K:
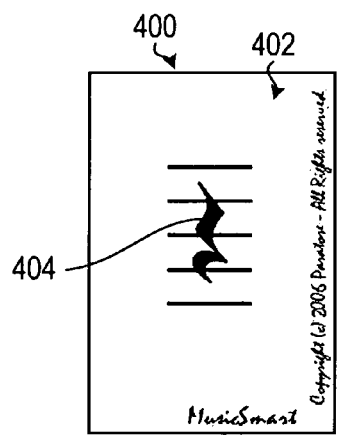

Referring to FIGS. 4A-4K, game piece 400 comprises body 402 with transparent back and at least one indicia representing an element used for construction of music structures on player card 300. For example, FIGS. 4A-4C depict exemplary game pieces 400 having indicia 404 representing shapes of a quarter note, a one eighth note and a whole note respectively that can be placed on staff 302 of player card 300 for building various music structures in a game according to this invention. Game piece 400 where indicia 404 depict notes may also have indicia 408 depicting the English pitch name using the C-D-E-F-G-A-B nomenclature and indicia 410 depicting the corresponding pitch name in the do-re-mi-fa-sol-la-ti-do nomenclature used in many parts of the world. FIGS. 4D and 4E show exemplary game pieces where indicia 404 depicts notes with staff line segments for construction of structures that have notes below staff 302 and above staff 302 respectively.

Examples of other structural elements depicted by indicia 404 comprise a bar symbol (FIG. 4F), a repeat sign (FIG. 4G), a time signature (FIG. 4H), a key signature (FIG. 4I), a clef (FIG. 4J), a rest (FIG. 4K) and so on.

Figure 5A:
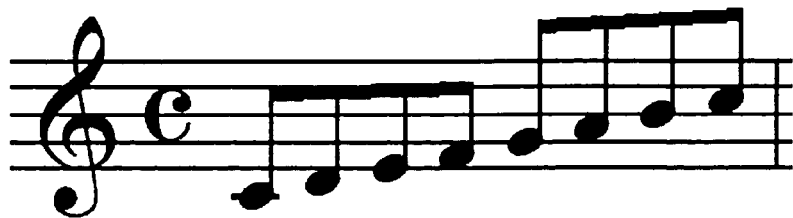
FIGS. 5A-5E show an exemplary scale structure (FIG. 5A), an exemplary interval structure (FIG. 5B), an exemplary chord structure (FIG. 5C), an exemplary bar structure (FIG. 5D) and an exemplary phrase structure (FIG. 5E) that can be constructed on a player card in a game in accordance with one embodiment of the present invention.
Figure 5B:
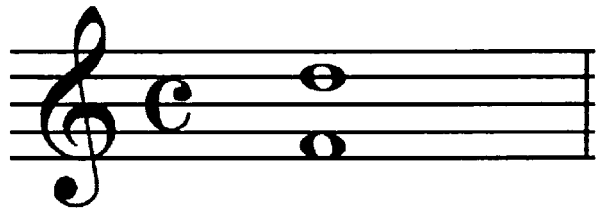
Figure 5C:
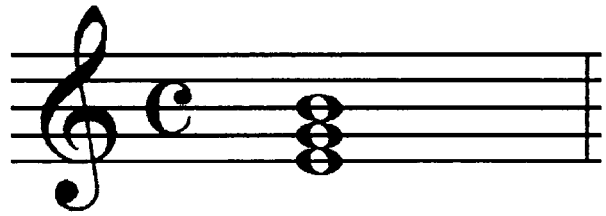
Figure 5D:
Figure 5E:
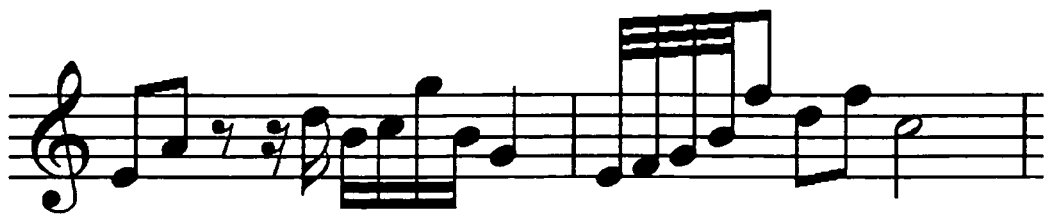
Figure 6A:
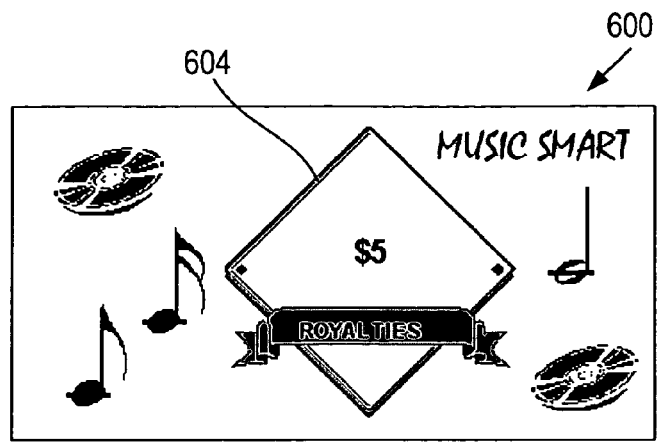
FIGS. 6A-6B show exemplary indicia of royalties money for use in a game in accordance with one embodiment of the present invention.
Figure 6B:
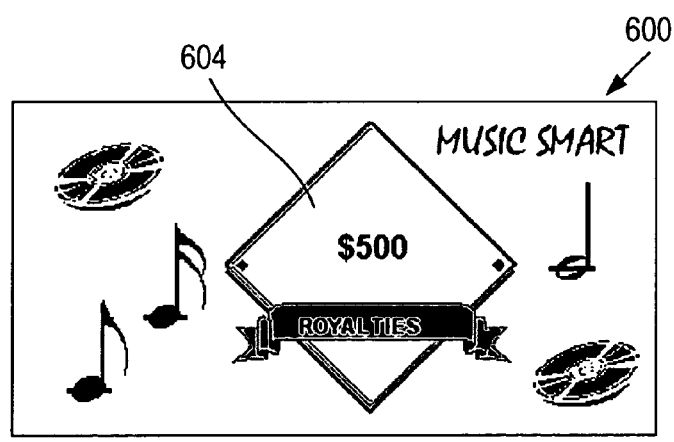
Figure 6C:
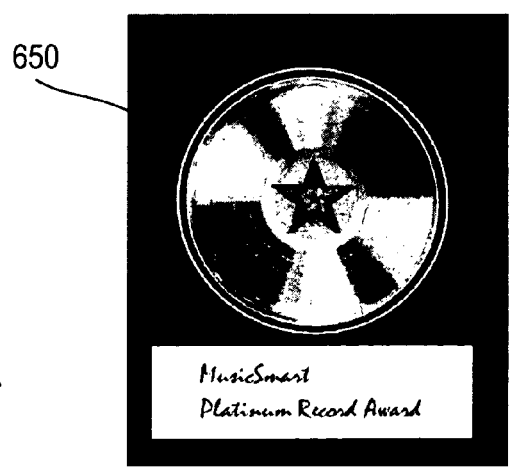
FIG. 6C shows exemplary indicia of platinum record award for use in a game in accordance with one embodiment of the present invention.

Exemplary music structures constructed on the player card in the course of the game comprise a scale (FIG. 5A), an interval (FIG. 5B), a chord (FIG. 5C), a bar line (FIG. 5D), a melody or phrase (FIG. 5E) and so on.

Figure 4L:
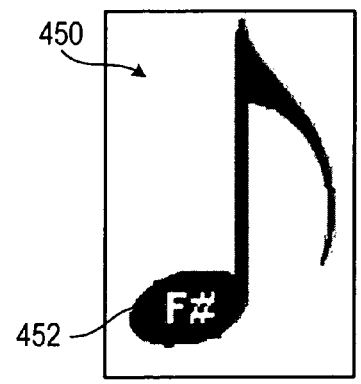

In another embodiment, an element used for construction of music structures on player card 300 is a cut out game piece. FIG. 4L illustrates an exemplary note element cut out 450 having indicia 452 depicting the note name.

Event Generators and Event Verifiers

A game according to this invention is played by generating a random event that in turn has a relationship with an element of a music structure that is the subject of a play. After a player generates a random event, he or she has to correctly place play piece 400 corresponding to the random event generated on staff 302 of his or her play card 300 in the proper location of the music structure that is the subject of the current play, as it will explained in the section describing an exemplary embodiment of the invention. The player uses an event verifier device to validate the correct placement of a play piece.

Figure 7A:
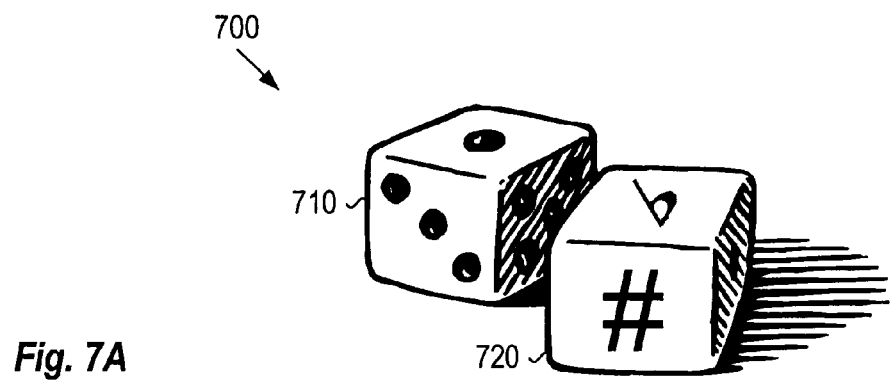
FIGS. 7A-7C show exemplary random event generators embodiments: custom pair of dice (FIG. 7A), spinning wheel (FIG. 7B) and a computer based device (FIG. 7C) for use in a game in accordance with one embodiment of the present invention.

FIG. 7A illustrates one type of event generator 700 according to one embodiment. Event generator 700 comprises a pair of dice. Dice 710 has indicia 2, 3, 2, 3, 2 and 3 on the respective sides. Dice 720 has indicia 2, 4, 2, 4, sharp symbol and flat symbol on the respective sides. The random events generated by event generator 700 comprise the numbers 2, 3, 4, 5, 6, 7, the sharp symbol and flat symbol. Each number and symbol has equal probability of occurrence. Table 1 shows all possible outcomes of event generator 700.

TABLE 1

Event generator outcomes.

|   | 2 | 3 | 2 | 3 | 2 | 3 |
|---|---|---|---|---|---|---|
| # | 2 | 3 | 2 | 3 | 2 | 3 |
| 2 | 4 | 5 | 4 | 5 | 4 | 5 |
| 4 | 6 | 7 | 6 | 7 | 6 | 7 |
| b | 2 | 3 | 2 | 3 | 2 | 3 |
| 2 | 4 | 5 | 4 | 5 | 4 | 5 |
| 4 | 6 | 7 | 6 | 7 | 6 | 7 |

Figure 7B:
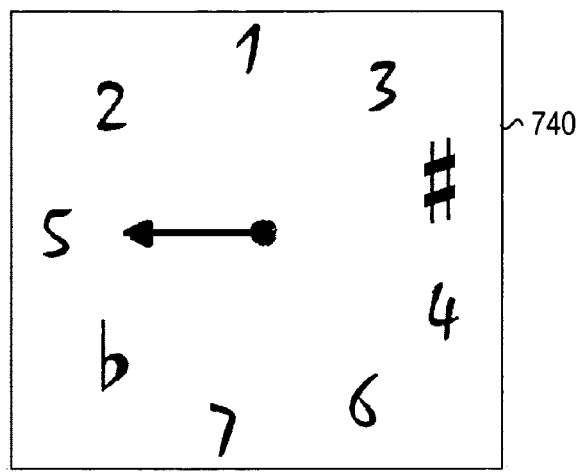
Figure 7C:
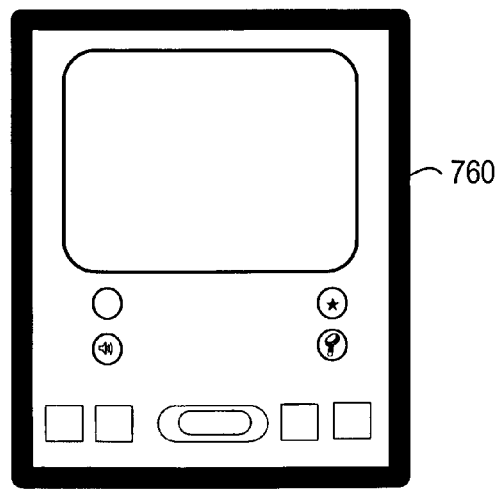

According to one embodiment the event generator 740 is a dial. An exemplary event generator is illustrated in FIG. 7B. Event generator 740 comprises a dial with random events indicia and a rotating arrow. According to one embodiment, the event generator may be computer generated. Any device capable of having a random event generated by software may generate the random event. Such devices include Personal Digital Assistant devices, computers, cell phone and so on. FIG. 7C illustrates a PDAs.

Random event generators and pseudo-random event generators can be used in a game in accordance with one embodiment of the present invention.

Figure 8A:
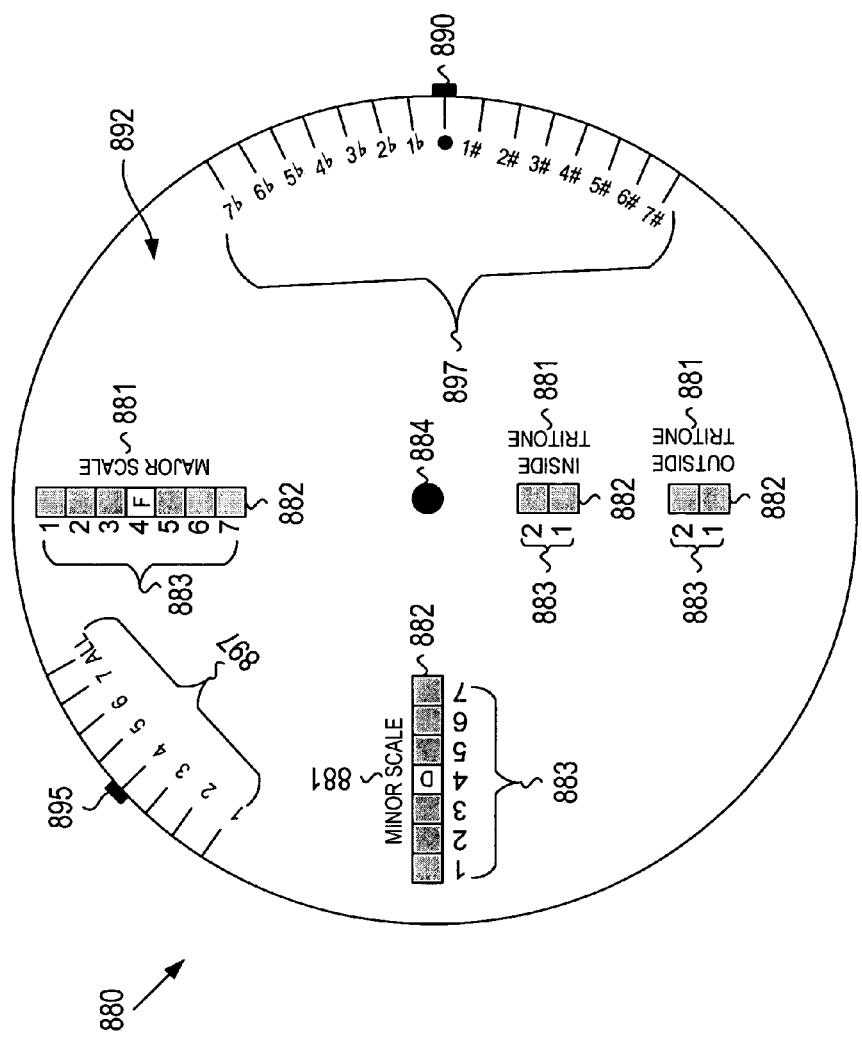
FIGS. 8A-8C show exemplary event verifier embodiments: a non-electronic, circular calculator event verifier, an electronic event verifier (FIG. 8B) and a computer based event verifier (FIG. 8C) for use in a game in accordance with one embodiment of the present invention.
Figure 8B:
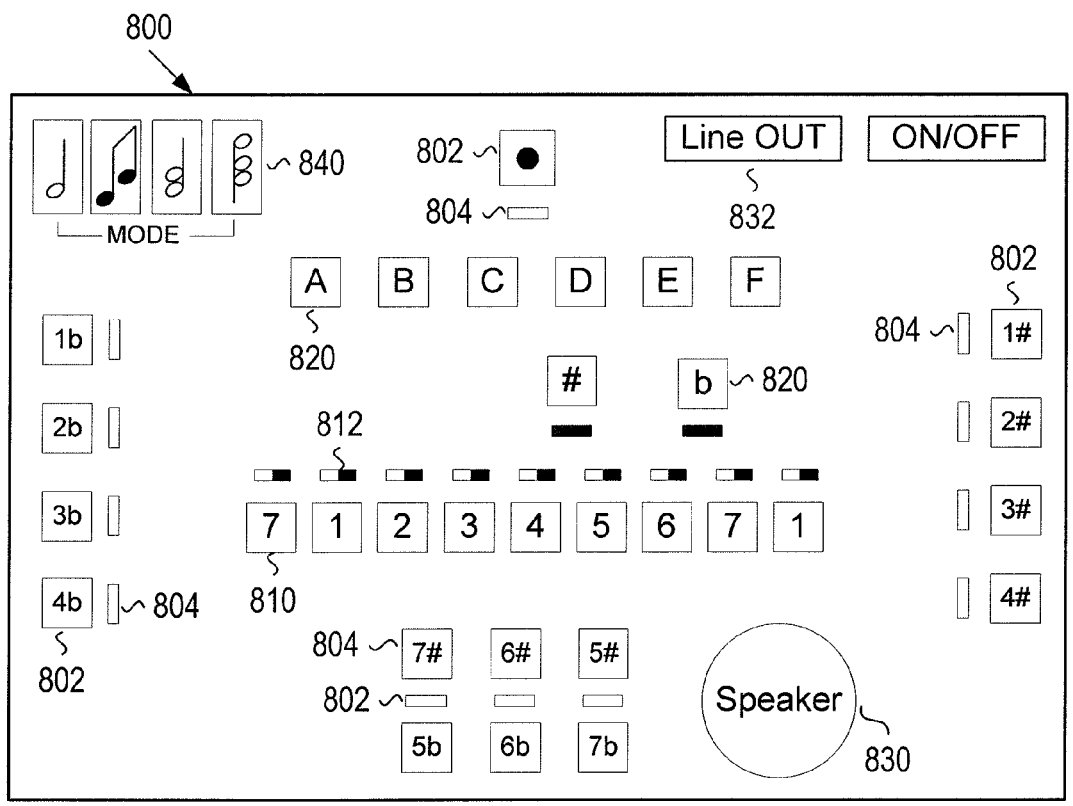
Figure 8C:
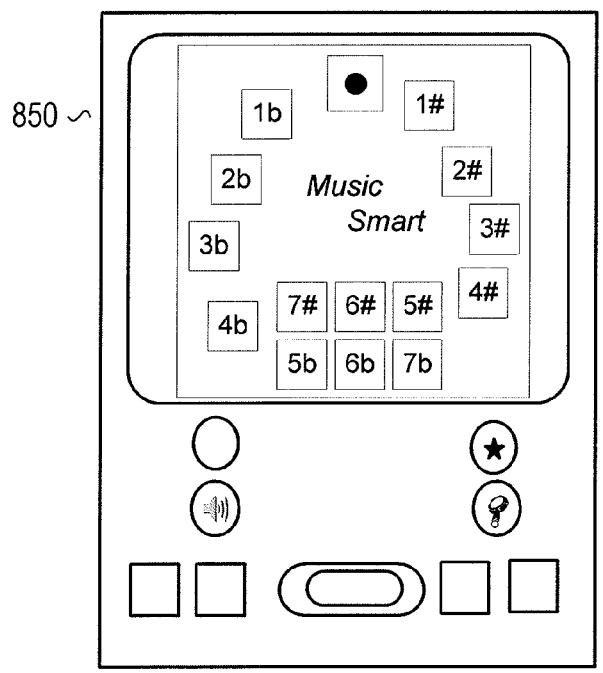

Referring to FIGS. 8A-C, three exemplary event verifier devices are shown. FIG. 8A illustrates an exemplary embodiment of event verifier 800 in the form of a circular calculator comprising first circular body 892 with several instances of cutout 882 for displaying the names of the elements comprising a music structure. First body 892 may have indicia 881 corresponding to the name of a structure and indicia 883 corresponding to a number associated with each element of the structure depicted near cutout 882. First body 892 may also have Indicia 897 depicting a graduated segment with numbers corresponding to the elements of a structure and indicia 891 depicting a graduated segment with symbols corresponding to locations on the paths of circle of fifths 150. A second circular body with extended tab 895 is placed under first circular body 892 having cutout to selectively display only the structure elements corresponding to the position of extended tab 895 with respect to graduated scale 897. A third circular body with extended tab 890 is placed under second circular body 892 having indicia depicting the name of the elements of a structure corresponding to the key signature selected by the position of extended tab 890 with respect to graduated scale 891. The three circular bodies are held together by fastener 884 in such a way that the three circular bodies can rotate freely about each other. Positioning tab 890 along a position on graduated scale 891 causes the names of the notes (elements) of each structure on first body 892 to be displayed in cutouts 882. Positioning tab 895 along a position on graduated scale 897 controls the display of specific elements of the structures on first body 892 by covering the portions of the structure that are not selected. For example, positioning tab 890 in the center position and positioning tab 894 in position 4 causes the name of the fourth elements of the major and minor scales with no accidentals (C major and A minor) to be displayed, in this case F and D respectively. Indicia showing placement of the note on the staff can also be displayed in a respective cutout 882.

Yet another embodiment of an event verifier is shown in FIG. 8B. Electronic event verifier 800 may also provide audio feedback by playing the pitches of the music structures in the game through speaker 830. An external amplifier connected to line out connector 832 may also reproduce the sound. Event verification is accomplished in the following manner:

1. Select structure to be verified with corresponding button 840.
2. Select button 802 to match the player's current position on board 100. Corresponding LED 804 lights up.
3. Enter the random event generated by throw of the dice and to be named by the player using corresponding button 810. Corresponding bicolor LED 812 lights up first color to indicate selection made.
4. Player names the event and enters the named event using corresponding mode button 820.
5. If the name matches the event corresponding to the element of the structure selected in step 1, bicolor LED 812 lights up second color to indicate successful match. If the name does not match the event, bicolor LED 812 turns off first color that was lit to indicate selection.

In an alternate embodiment, event verifier 800 may include additional hardware of software for embodying a random event. Furthermore, the functionality of event verifiers 800 and 880 can be embodied in software on a computer based platform such as but not limited to a Personal Digital Assistant device shown in FIG. 8C.

EXEMPLARY EMBODIMENT OF THE INVENTION

An exemplary intermediate level game according to this invention will be described. Entry level and advanced level games are also possible according to principles of this invention.

The music structures in this exemplary game are: major scales, inside tritones, right outside tritones and left outside tritones.

A major scale structure consists of seven distinct positions: 1, 2, 3, 4, 5, 6, and 7. After position 7, the scale structure repeats at an octave higher (corresponding pitch frequencies have a ratio of 1:2). Position 1 is called the tonic. The name of the tonic note is also the name of the major scale and the key signature. The pitch of the tonic is the home sound for the key signature. The following pitch distances between positions characterize the structure of a major scale: W, W, H, W, W, W, H (W=whole tone and H=Half tone). For example, in the key of C major, the notes occupying the seven positions of the scale structure are: C, D, E, F, G, A, B.

A tritone is an interval of two notes separated by three tones. Its sound is perceived as unstable and it wants to resolve to a more stable sound.

An inside tritone structure consists of two positions. Position 1 is characterized by note 7 of a major scale and position 2 is characterized by note 4 of the major scale. The inside tritone resolves to notes 1 and 3 of the major scale, hence the tension created by notes within the key resolves back to the home key.

A right outside tritone structure consists of two positions. Position 1 is characterized by note 4 of a major scale sharped and position 2 is characterized by note 1 of the major scale. It should be pointed out that the sharped note 4 is not part of the major scale. The right outside tritone resolves to notes 1 and 3 of the major scale located to the right (clockwise direction) on circle of fifths 150, hence the tension created by this tritone resolves to the neighboring key signature on the right.

A left outside tritone structure consists of two positions. Position 1 is characterized by note 3 of a major scale and position 2 is characterized by note 7 of the major scale flatted. It should be pointed out that the flatted note 7 is not part of the major scale. The left outside tritone resolves to notes 1 and 3 of the major scale located to the left (counterclockwise direction) on circle of fifths 150, hence the tension created by this tritone resolves to the neighboring key signature on the left.

A game according to this invention and using the structures defined above is played according to the following rules.

A player is chosen to handle the awards and fee collection.

All players start at position 101 on game board 100 by placing the respective player pieces 200 on position 101.

All players receive a player card 300 with indicia 308 corresponding to position 101.

Figure 9B:
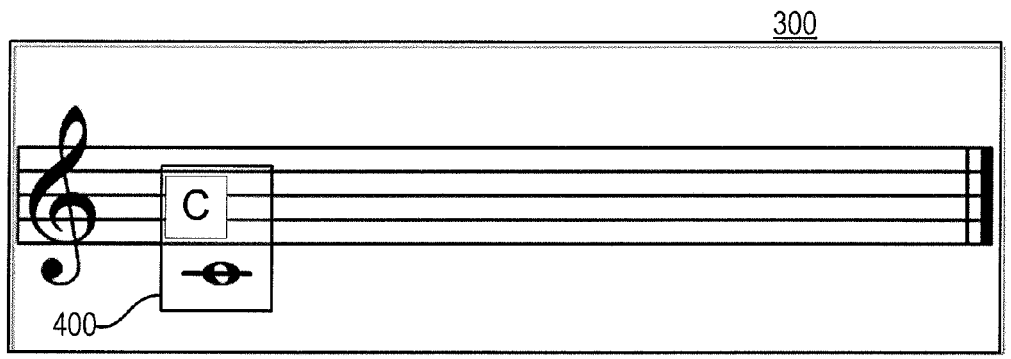
FIGS. 9B-9D show steps required to complete a scale structure play in a game in accordance with one embodiment of the present invention.

All player receive a game piece 400 with indicia 408 representing the note C and place it on player card 300 as shown in FIG. 9B.

The object of the game is to go around circle of fifths 150 in either direction.

At least two music structures must be completed in each position along circle of fifths 150 as explained below.

First, the major scale associated with each position on circle of fifths 150 must be completed, as it will be explained. Royalties money may be awarded according to the schedule in Table 2 for the successful completion of a major scale.

Second, the inside tritone structure must be completed as it will be explained. Royalties money may be awarded according to the schedule in Table 2 for the successful completion of an inside tritone.

After completion of these two structures, a player may choose to repeat them in order to practice them again and to earn more royalties money.

A player can move on to either of the adjacent positions in one of two ways:

1—Pay a toll fee according to the schedule in Table 1.

2—Play the right outside tritone or the left outside tritone. Royalties money is awarded according to the schedule in Table 2 for the successful completion of an outside tritone.

After moving to a new position, a player receives a player card 300 corresponding to the new position and a play piece 400 with indicia 408 representing note 1 (tonic) of the new key signature to be placed on player card 300.

Upon completion of a path around circle of fifths 150 and returning to position 101, a player may receive a platinum disk award 650 and royalties money may be awarded according to the schedule in Table 2.

The player with the most earned royalties wins a game.

TABLE 2

Toll Fees schedule

|  | From or To Start Position | From or To 1-4 sharps/flats | From or To 5 to 7 sharps/flats |
|---|---|---|---|
| Key Toll Fee: | $20 | $25 | $30 |

TABLE 3

Royalties Schedule

|  | No Accidentals (Start Position) | 1 to 4 sharps/ flats | 5 to 7 sharps/ flats | Enharmonic Double Play |
|---|---|---|---|---|
| Completion of a Scale: | $5 | $10 | $15 | $40 |
| Correct Inside Tritone: | $10 | $15 | $20 | $50 |
| Correct Outside Tritone: | $20 | $25 | $30 | $70 |
| First Golden Disk Award: | $500 | | | |
| Additional Golden Disk Awards: | $250 | | | |

Figure 9C:
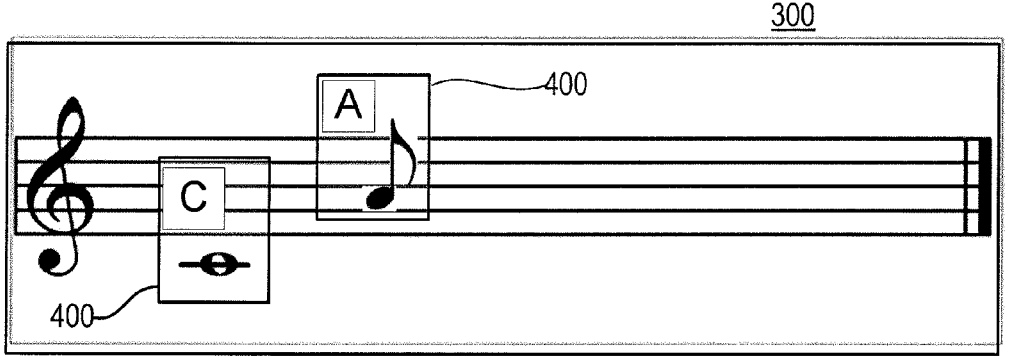
Figure 9C:
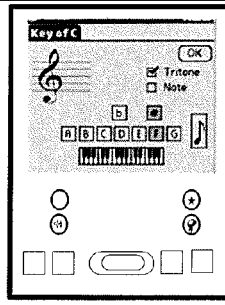
Figure 9D:
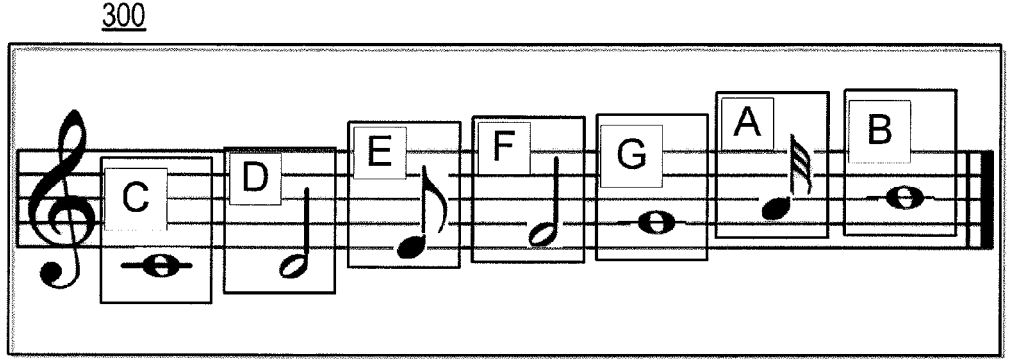

A major scale is played by generating a random event with an event generator such as a pair of dice 700 consisting of a number between 2 and 7 corresponding to the positions of the major scale structure. A player names the note (pitch) believed to correspond to the number. Correctness of the named pitch is verified using an event generator such as circular calculator 880 or a computer based device 850. If the name is verified, the player places a corresponding play piece 400 with indicia 408 representing the named note and places it on player card 300. FIG. 9C shows the case of a play in position 101 (C major) where a 3 was rolled and the correct name E was placed on 300 after verifying the name with event verifier 850 or event verifier 880. After a correct play, a player rolls again until he or she rolls a number corresponding to a structure already occupied on player card 300 or guesses the name incorrectly. FIG. 9C shows a player card 300 with a completed C major scale.

Inside and outside tritone structures are played in a similar fashion with one difference: accidental pieces 250 are used to play outside tritones. Spin wheel event generator 740 is used to play tritones. Here a player must accumulate all the elements believed to make up the tritone structure before the verification step. That is to say, if a player spins a number or accidental believed to be part of the intended tritone structure, then he or she places the corresponding play piece 400 or accidental piece 250 on player card 300 and spins again. The tritone verification step occurs when all elements of the tritone structure are believed to be present on player card 300.

FIGS. 9E-9G show the elements collection steps required to complete a right outside tritone play in the key of C major. In this particular instance, the first random event recognized (FIG. 9E) was note was element 1 of the tritone which is F (note 4 of the key of C). The second random element was the sharp sign that was placed near note 1 to indicate the F is sharped (FIG. 9F). Finally, the last random event recognized (FIG. 9G) was element 2 of the tritone, which is C (note 1 of the key of C). Collection of the elements of the tritone structure does not have to occur in a specific sequence; however, the elements must be placed on staff 302 of player card 300 in the proper order. That is, the note corresponding to position 1 must be placed below the note corresponding to position 2. Verification of the structure using event verifier 850 is shown in FIGS. 9F-9J. First, the note corresponding to position 1 (F♯ in this case) is entered (FIG. 9H). Next, the note corresponding to position 2 (C in this case) is entered (FIG. 9I) and if the pair is correct, the tritone sound is played followed by the interval that it resolves to (FIG. 9J). Indicia 852 depicting the piano keys (or any other instrument) corresponding to the intervals played may be displayed on the event verifier. Alternatively, event verifier 880 can be used.

The foregoing is a description of an exemplary embodiments and best mode of the invention known to the applicant at the time of filing the application. The invention is not limited to the specific forms shown. For example, modifications may be made in the design and arrangement of the elements within the scope of the invention, as expressed in the appended claims.

OTHER EMBODIMENTS

While in the preferred embodiment, game 900 is implemented as a board game, game 900 is readily adaptable to a computer environment, and may be downloaded or provided on a floppy disk, CD ROM, or other suitable medium. Further, in an electronic embodiment, the game can be played by players at diverse locations via a local area network, wide area network or an extended network such as the Internet in a client-server mode or it can be played in a decentralized mode whereby one player also serves as the game master. Accordingly, the various terms employed in the above description to identify physical components, such as Game board 100, player piece 200, player card 300, play pieces 400, play money 600 etc. should be taken to include electronic media equivalents.

The embodiments of the present invention may also be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

The invention claimed is:

1. A method of playing a music game for teaching music skills to players on a game board comprising at least one game path including a plurality of spaces, wherein each space is uniquely marked with indicia representing a key signature used to identify music elements and music structures related to the key signature, said method comprising:

placing a player piece associated with a player on a space on the board;

generating, using an event generator, at least one random event corresponding to a music element of a music structure that is the subject of a play;

marking a player card associated with a player with a play piece having indicia representing the music element when the player correctly identifies the music element corresponding to the generated random event after confirmation by an event verifier;

moving the player piece along the game path when the player correctly identifies at least one music structure related to the key signature represented in the spaces of the game path currently occupied by the player piece after confirmation by the event verifier.

2. The method of claim 1 wherein the music structure comprises a scale, an interval, a tritone, a chord, a chord progression, an inside tritone, a right outside tritone and a left outside tritone.

3. The method of claim 1, wherein a path is the circle of fifths.

4. A game for teaching music skills to players, the game comprising:

a game board comprising at least one game path thereon, said path comprising a plurality of spaces, wherein each space is uniquely marked with indicia of a key signature used to identify music elements and music structures related to the key signature;

game pieces for representing the players and for marking a position of the players on a path on the board;

player cards each having indicia of a music staff line and indicia of a key signature;

game pieces with indicia of music elements for construction of music structures on the player cards;

a random events generator for generating at least a random event corresponding to a music element of a music structure that is the subject of a play; and an event verifier to verify correct identification by a player of the music elements and the music structures corresponding to generated random events.

5. The method of claim 4 wherein the music structure comprises a scale, an interval, a tritone, a chord, a chord progression, an inside tritone, a right outside tritone and a left outside tritone.

6. The game of claim 4, wherein a path is a the circle of fifths.

7. The game of claim 4, wherein the random event generator is software.

8. The game of claim 4, wherein the game pieces have a transparent back.

9. The game of claim 4, wherein the game pieces are cut outs.

10. The game of claim 4, wherein the event verifier is software.

11. The game of claim 4, wherein the event verifier includes a circular calculator.

12. The game of claim 4, wherein the random event generator and the event verifier include electronic circuits.

13. A computer program, residing on a computer readable medium, for teaching music skills to players, the computer program comprising instructions for causing a programmable processor to:

display a game board comprising at least one game path including a plurality of spaces, wherein each space is uniquely marked with indicia representing a key signature used to identify music elements and music structures related to the key signature;

display a player piece associated with a player on a space on the board;

display game pieces for representing the players and for marking a position of the players on a path on the board;

display player cards each having indicia of a music staff line and indicia of a key signature;

display game pieces with indicia of music elements for construction of music structures on the player cards;

display and operate a random events generator for generating at least a random event corresponding to a music element of a music structure that is the subject of a play; and display and operate an event verifier to verify correct identification by a player of the music elements and the music structures corresponding to generated random events;

receive inputs from a player; and display actions of a music game wherein:

a player piece associated with a player is placed on a space on the board;

the event generator generates at least one random event corresponding to a music element of a music structure that is the subject of a play;

a player card associated with a player is marked with a play piece having indicia representing the music element when the player correctly identifies the music element corresponding to the generated random event after confirmation by the event verifier;

a player piece is moved along the game path when the player correctly identifies at least one music structure related to the key signature represented in the space of the game path currently occupied by the player piece after confirmation by the event verifier.

14. The game of claim 13, wherein a path is the circle of fifths.

15. The game of claim 13, wherein the random events generated by the event generator comprise a representation of the number 2, the number 4, the number 5, the number 6, the number 7, the sharp symbol and the flat symbol.

16. The method of claim 13 wherein the music structure comprises, a scale, an interval, a tritone, a chord, a chord progression, an inside tritone, a right outside tritone and a left outside tritone.

17. The method of claim 1, wherein the random events generated by the event generator comprise a representation of the number 2, the number 4, the number 5, the number 6, the number 7, the sharp symbol and the flat symbol.

18. The method of claim 4, wherein the random events generated by the event generator comprise a representation of the number 2, the number 4, the number 5, the number 6, the number 7, the sharp symbol and the flat symbol.

* * * * *